(12) United States Patent
Komazawa

(10) Patent No.: US 12,346,618 B2
(45) Date of Patent: Jul. 1, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 453 days.

(21) Appl. No.: 17/719,355

(22) Filed: Apr. 12, 2022

(65) Prior Publication Data

US 2023/0114012 A1   Apr. 13, 2023

(30) Foreign Application Priority Data

Oct. 7, 2021   (JP) .................. 2021-165352

(51) Int. Cl.
*G06F 3/12* (2006.01)
*H04N 1/00* (2006.01)

(52) U.S. Cl.
CPC .......... *G06F 3/1275* (2013.01); *G06F 3/1208* (2013.01); *H04N 1/00015* (2013.01); *H04N 1/00037* (2013.01)

(58) Field of Classification Search
CPC .... G06F 3/1275; G06F 3/1208; G06F 3/1259; G06F 3/1282; H04N 1/00015; H04N 1/00037

See application file for complete search history.

(56) References Cited

U.S. PATENT DOCUMENTS

| 9,207,887 B1* | 12/2015 | Lahey ................... G06F 3/1256 |
| 2019/0258233 A1* | 8/2019 | Taira ..................... G05B 19/18 |
| 2021/0082100 A1* | 3/2021 | Tsukamoto ............. G06T 7/001 |

FOREIGN PATENT DOCUMENTS

| JP | 2008015917 | 1/2008 |
| JP | 2021041628 | 3/2021 |
| JP | 2021089605 | 6/2021 |

OTHER PUBLICATIONS

"Office Action of Japan Counterpart Application", issued on Apr. 30, 2025, with English translation thereof, p. 1-p. 5.

\* cited by examiner

*Primary Examiner* — John R Wallace
(74) *Attorney, Agent, or Firm* — JCIPRNET

(57) ABSTRACT

An information processing apparatus includes a processor configured to: specify a quality required for a print medium included in a product for which an instruction for production on a specific production line among plural production lines is given; and perform a control such that one inspection apparatus having an inspection accuracy according to the quality performs an inspection of the print medium, the one inspection apparatus being included in plural inspection apparatuses provided on the plural production lines.

12 Claims, 12 Drawing Sheets

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-165352 filed Oct. 7, 2021.

BACKGROUND

(i) Technical Field

The present invention relates to an information processing apparatus, a non-transitory computer readable medium storing a program, and an information processing method.

(ii) Related Art

JP2008-15917A discloses an information processing apparatus that symbolizes a print workflow indicated in a print process job ticket, includes the symbolized workflow in print condition metadata of the print process job ticket, maintains the print process job ticket, and determines validity of the workflow in the print process job ticket as a verification target by comparing and collating the print process job ticket as a verification target and each symbolized workflow in the maintained print process job ticket.

SUMMARY

A plurality of inspection apparatuses provided on a plurality of production lines may have different print-medium inspection accuracies. In this case, in order to adopt a configuration for instructing production of a product on a production line including an inspection apparatus having an inspection accuracy according to a quality required for a print medium included in the product, it is necessary to select, from a plurality of production lines, a production line for an instruction of production of the product including the print medium in consideration of print-medium inspection accuracies of a plurality of inspection apparatuses.

Aspects of non-limiting embodiments of the present disclosure relate to an information processing apparatus, a non-transitory computer readable medium storing a program, and an information processing method that can select a production line for an instruction of production of a product including a print medium from a plurality of production lines without considering print-medium inspection accuracies of a plurality of inspection apparatuses provided on the plurality of production lines.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: specify a quality required for a print medium included in a product for which an instruction for production on a specific production line among a plurality of production lines is given; and perform a control such that one inspection apparatus having an inspection accuracy according to the quality performs an inspection of the print medium, the one inspection apparatus being included in a plurality of inspection apparatuses provided on the plurality of production lines.

BRIEF DESCRIPTION OF THE DRAWINGS

Exemplary embodiment (s) of the present invention will be described in detail based on the following figures, wherein.

DETAILED DESCRIPTION

Figure 1:
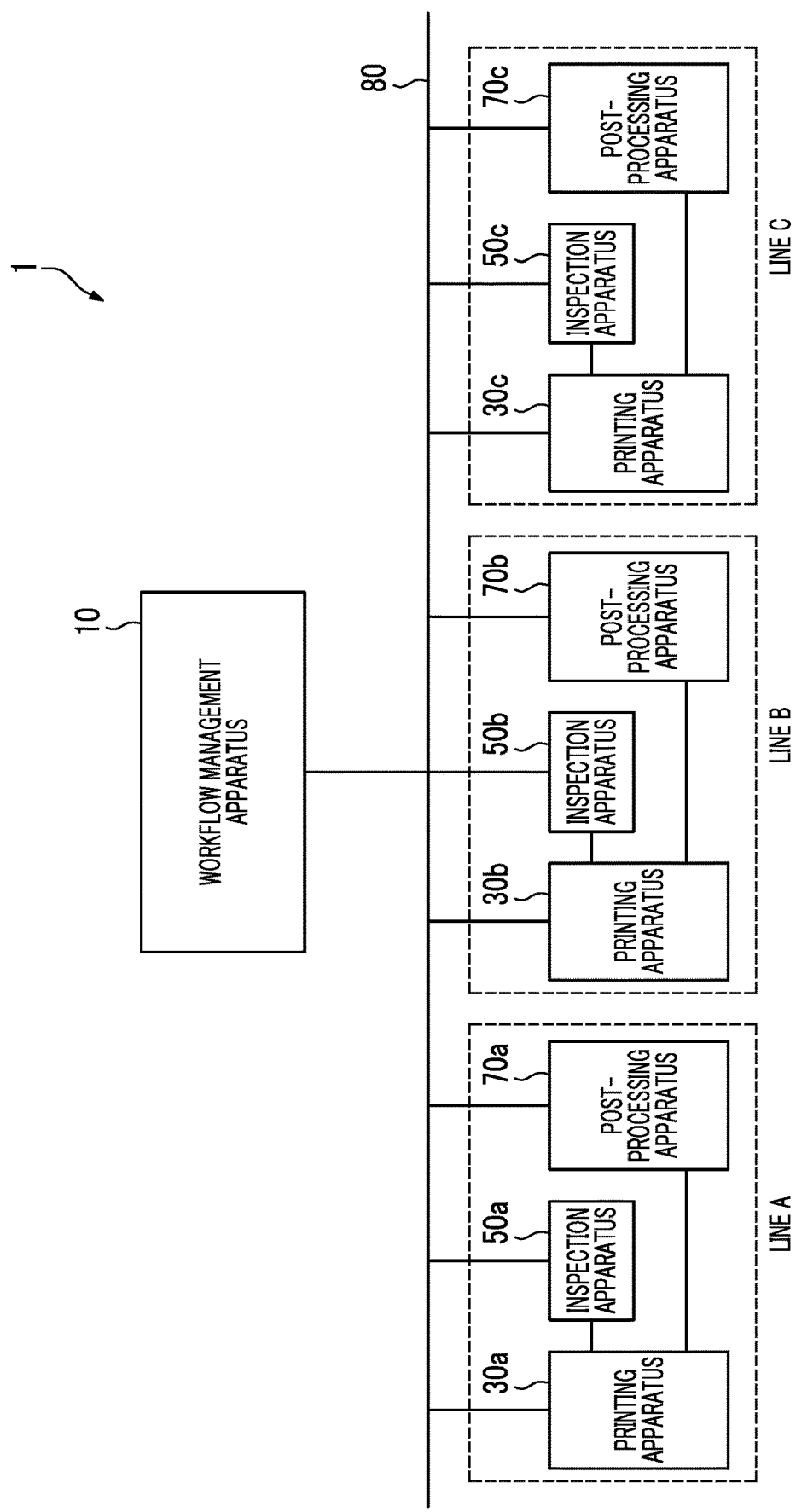
FIG. 1 is a diagram illustrating an overall configuration example of a printing system according to an exemplary embodiment of the present invention.

Hereinafter, an exemplary embodiment of the present invention will be described in detail with reference to the accompanying drawings.

Outline of Present Exemplary Embodiment

The present exemplary embodiment provides an information processing apparatus for specifying a quality required for a print medium included in a product for which an instruction for production on a specific production line among a plurality of production lines is given and performing a control such that one inspection apparatus having an inspection accuracy according to the quality performs an inspection of the print medium, the one inspection apparatus being included in a plurality of inspection apparatuses provided on the plurality of production lines.

Further, the present exemplary embodiment also provides an information processing apparatus for performing a control such that one inspection apparatus performs inspections of a plurality of print mediums in an order according to time information on the plurality of production lines in a case where the one inspection apparatus is controlled to perform inspections of the plurality of print mediums printed on the plurality of production lines.

Here, a production line refers to an assembly line process for producing a certain product in large quantities. Hereinafter, the "production line" is simply referred to as a "line".

A product is an article produced by production. In the present exemplary embodiment, it is assumed that the product particularly includes a print medium. That is, the product may include other material as long as the product includes a print medium. In the following, a printed matter that includes a print medium on which a main text is printed and a cover or a binding will be described as an example.

The inspection of the print medium means checking whether the print medium is normal or abnormal. The inspection of the print medium may mean checking which part of the print medium is normal or abnormal. In the following, an example of checking whether an image printed on a medium is normal or abnormal will be described.

A medium is an object which is used to communicate some information and on which an image can be printed. Examples of the medium include, for example, paper, a plastic sheet, and the like. In the following, an example in which the medium is paper will be described.

Further, the information processing apparatus may be a workflow management apparatus in a printing system including the workflow management apparatus, a printing apparatus, and an inspection apparatus. Alternatively, the former information processing apparatus and the latter information processing apparatus may be separate apparatuses in the printing system. In this case, the information processing apparatus may be regarded as an "information processing system". In the following, a case where the former information processing apparatus is used as a printing apparatus and the latter information processing apparatus is used as an inspection apparatus will be described as an example.

Overall Configuration of Printing System

FIG. 1 is a diagram illustrating an overall configuration example of a printing system 1 according to the present exemplary embodiment. As illustrated in FIG. 1, the printing system 1 includes a workflow management apparatus 10, printing apparatuses 30a to 30c, inspection apparatuses 50a to 50c, and post-processing apparatuses 70a to 70c, which are connected to a communication line 80. Further, as illustrated in FIG. 1, it is assumed that the printing apparatus 30a, the inspection apparatus 50a, and the post-processing apparatus 70a are provided on a line A, that the printing apparatus 30b, the inspection apparatus 50b, and the post-processing apparatus 70b are provided on a line B, and that the printing apparatus 30c, the inspection apparatus 50c, and the post-processing apparatus 70c are provided on a line C.

In FIG. 1, the printing apparatuses 30a to 30c, the inspection apparatuses 50a to 50c, and the post-processing apparatuses 70a to 70c are illustrated. On the other hand, in a case where it is not necessary to distinguish the apparatuses, the apparatuses may be referred to as the printing apparatus 30, the inspection apparatus 50, and the post-processing apparatus 70. Further, in FIG. 1, the printing apparatus 30, the inspection apparatus 50, and the post-processing apparatus 70 are respectively illustrated by three. On the other hand, the apparatuses may be respectively provided by four or more. There may be a line on which the inspection apparatus is not provided.

The workflow management apparatus 10 is an apparatus that performs scheduling of processes such as input of an original document, printing on paper based on the original document, generation of a printed matter by post-processing on the printed paper, and transporting of the printed matter and manages the processes as a workflow. Further, the workflow management apparatus 10 also controls and monitors the apparatuses such as the printing apparatus 30 that performs printing on paper based on an original document and the post-processing apparatus 70 that performs post-processing on the printed paper. As the workflow management apparatus 10, for example, a general-purpose personal computer may be used.

The printing apparatus 30 is an apparatus that performs printing of an image on paper. The printing apparatus 30 also has a function of reading an image printed on paper.

The inspection apparatus 50 performs an inspection of an image printed on paper by the printing apparatus 30. Specifically, the inspection apparatus 50 performs an inspection of an image by comparing a reference image with a read image, the reference image being a reference image to be printed by the printing apparatus 30, and the read image being obtained by the printing apparatus 30 by reading an image actually printed by the printing apparatus 30.

Here, an inspection configuration in a case of using, as a reference image, an image obtained by reading a sample image in advance is referred to as an "analog-analog configuration", and an inspection configuration in a case of using, as a reference image, a rasterized image which is an image rasterized by a printing instruction is referred to as a "digital-analog configuration". Alternatively, it is considered that a sample rasterized image is used as a reference image and a rasterized image for each printing is used as an image to be inspected instead of a read image. The inspection configuration is referred to as a "digital-digital configuration". In the present exemplary embodiment, any of these inspection configurations may be used. In the following, a case where the "digital-analog configuration" is used will be described as an example.

Further, in the present exemplary embodiment, the inspection apparatus 50 is shared among a plurality of lines. In FIG. 1, the inspection apparatus 50 is provided outside the printing apparatus 30. On the other hand, the inspection apparatus 50 may be provided inside the printing apparatus 30. As the inspection apparatus 50, for example, a general-purpose personal computer may be used.

The post-processing apparatus 70 is an apparatus that performs post-processing on paper on which an image is printed by the printing apparatus 30. The post-processing includes, for example, saddle stitching processing in which a bundle of paper is folded in half and is bound at folded portions, cutting processing for cutting paper, and the like.

Hardware Configuration of Workflow Management Apparatus

Figure 2:
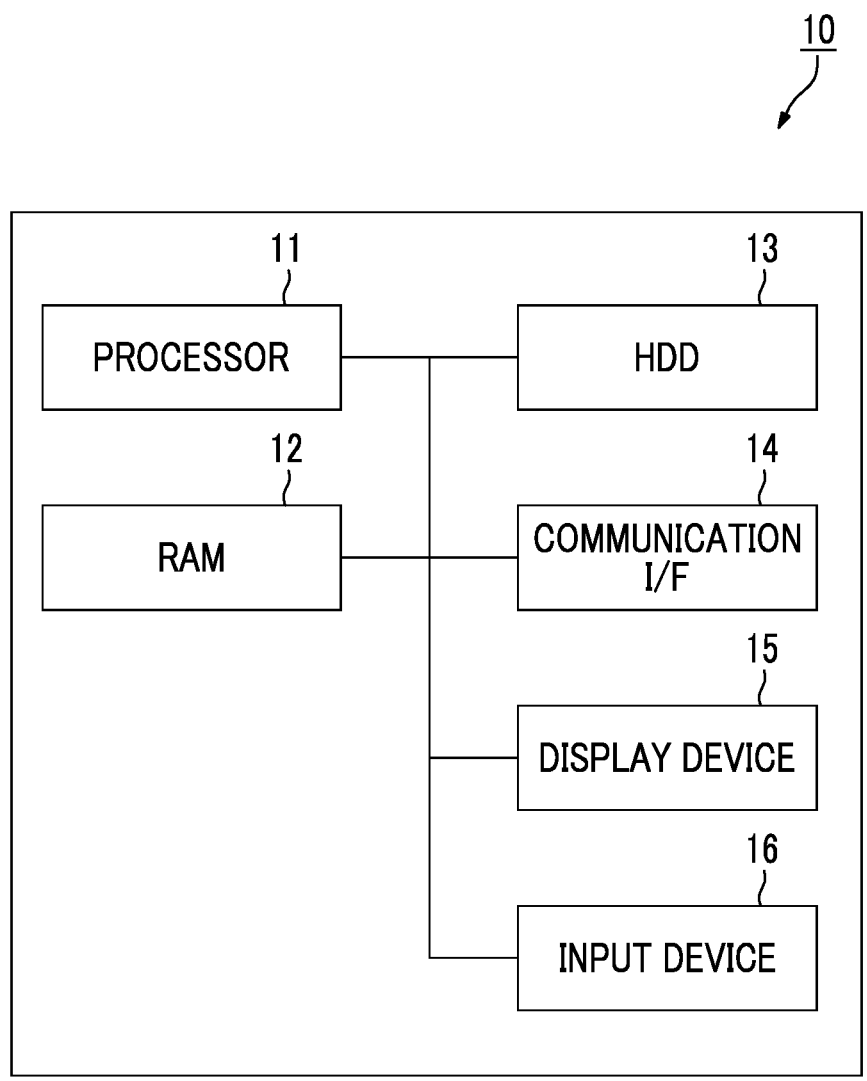
FIG. 2 is a diagram illustrating a hardware configuration example of a workflow management apparatus according to the exemplary embodiment of the present invention.

FIG. 2 is a diagram illustrating a hardware configuration example of the workflow management apparatus 10 according to the present exemplary embodiment. As illustrated in FIG. 2, the workflow management apparatus 10 includes a processor 11, a random access memory (RAM) 12, a hard disk drive (HDD) 13, a communication interface (hereinafter, referred to as "communication I/F") 14, a display device 15, and an input device 16.

The processor 11 realizes each function of the workflow management apparatus 10 to be described later by executing various software such as an operating system (OS) and an application program.

The RAM 12 is a memory used as a work memory of the processor 11. The HDD 13 is, for example, a magnetic disk device that stores input data for various software, output data from various software, and the like.

The communication I/F 14 transmits/receives various information to/from the printing apparatus 30 and the like via a communication line 80.

The display device 15 is, for example, a display that displays various information. The input device 16 is, for example, a keyboard or a mouse used to receive information from a user.

Hardware Configuration of Printing Apparatus

Figure 3:
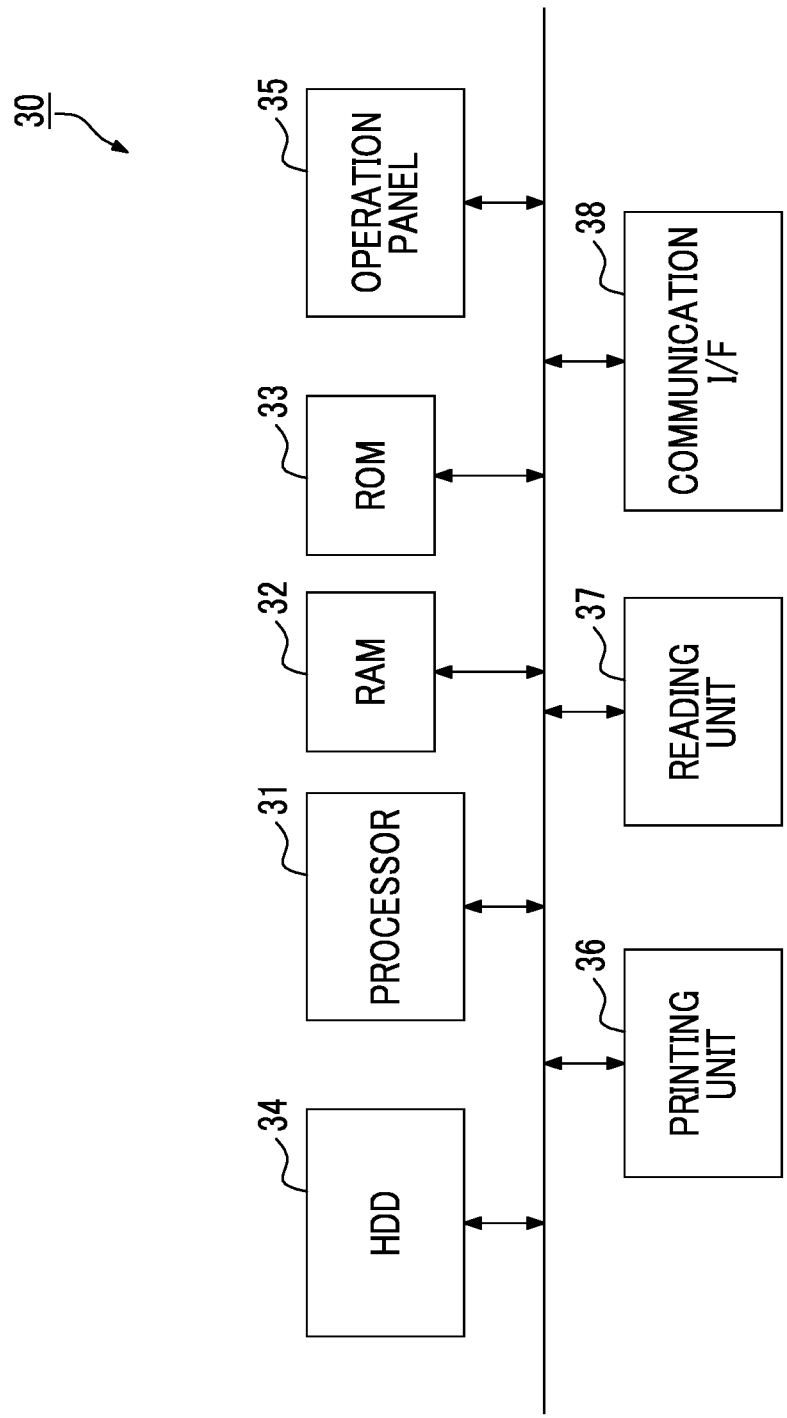
FIG. 3 is a diagram illustrating a hardware configuration example of a printing apparatus according to the exemplary embodiment of the present invention.

FIG. 3 is a diagram illustrating a hardware configuration example of the printing apparatus 30 according to the present exemplary embodiment. As illustrated in FIG. 3, the printing apparatus 30 includes a processor 31, a RAM 32, a read only memory (ROM) 33, an HDD 34, an operation panel 35, a printing unit 36, a reading unit 37, and a communication I/F 38.

The processor 31 realizes each function of the printing apparatus 30 to be described later by loading various programs stored in the ROM 33 or the like into the RAM 32 and executing the programs.

The RAM 32 is a memory used as a work memory of the processor 31. The ROM 33 is a memory that stores various programs and the like to be executed by the processor 31. The HDD 34 is, for example, a magnetic disk device that stores print data and the like used for printing in the printing unit 36.

The operation panel 35 is, for example, a touch panel that displays various information and receives operation input from a user. Here, the operation panel 35 includes a display on which various information is displayed and a position detection sheet that detects a position designated by pointing means such as a finger or a stylus pen. Alternatively, a display and a keyboard may be used instead of the touch panel.

The printing unit 36 prints an image on paper. Here, the printing unit 36 is, for example, a printer. A electrophotographic printer that forms an image by transferring toner attached to a photosensitive body to paper or an inkjet printer that forms an image by ejecting an ink onto paper may be used.

The reading unit 37 reads the image printed on the paper by the printing unit 36. Here, the reading unit 37 is, for example, a scanner. A charge coupled devices (CCD) type scanner that irradiates an original document with light from a light source, reduces reflected light by a lens, and receives the reflected light by CCD, or a contact image sensor (CIS) type scanner that sequentially irradiates an original document with light from an LED light source and receives reflected light by CIS may be used.

The communication I/F 38 transmits and receives various information to and from the workflow management apparatus 10, the inspection apparatus 50, and the like via the communication line 80.

Hardware Configuration of Inspection Apparatus

Figure 4:
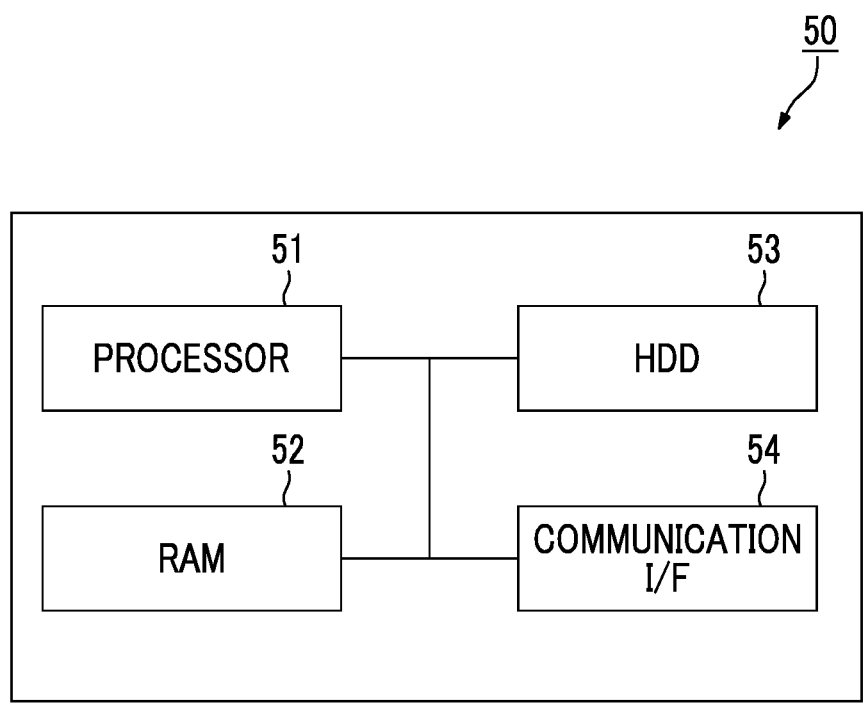
FIG. 4 is a diagram illustrating a hardware configuration example of an inspection apparatus according to the exemplary embodiment of the present invention.

FIG. 4 is a diagram illustrating a hardware configuration example of the inspection apparatus 50 according to the present exemplary embodiment. As illustrated in FIG. 4, the inspection apparatus 50 includes a processor 51, a RAM 52, an HDD 53, and a communication I/F 54.

The processor 51 realizes each function of the inspection apparatus 50 to be described later by executing various software such as an operating system (OS) and an application program.

The RAM 52 is a memory used as a work memory of the processor 51. The HDD 53 is, for example, a magnetic disk device that stores input data for various software, output data from various software, and the like.

The communication I/F 54 transmits and receives various information to and from the printing apparatus 30 and the like via the communication line 80.

Specific Example of Operation of Printing System

Figure 5:
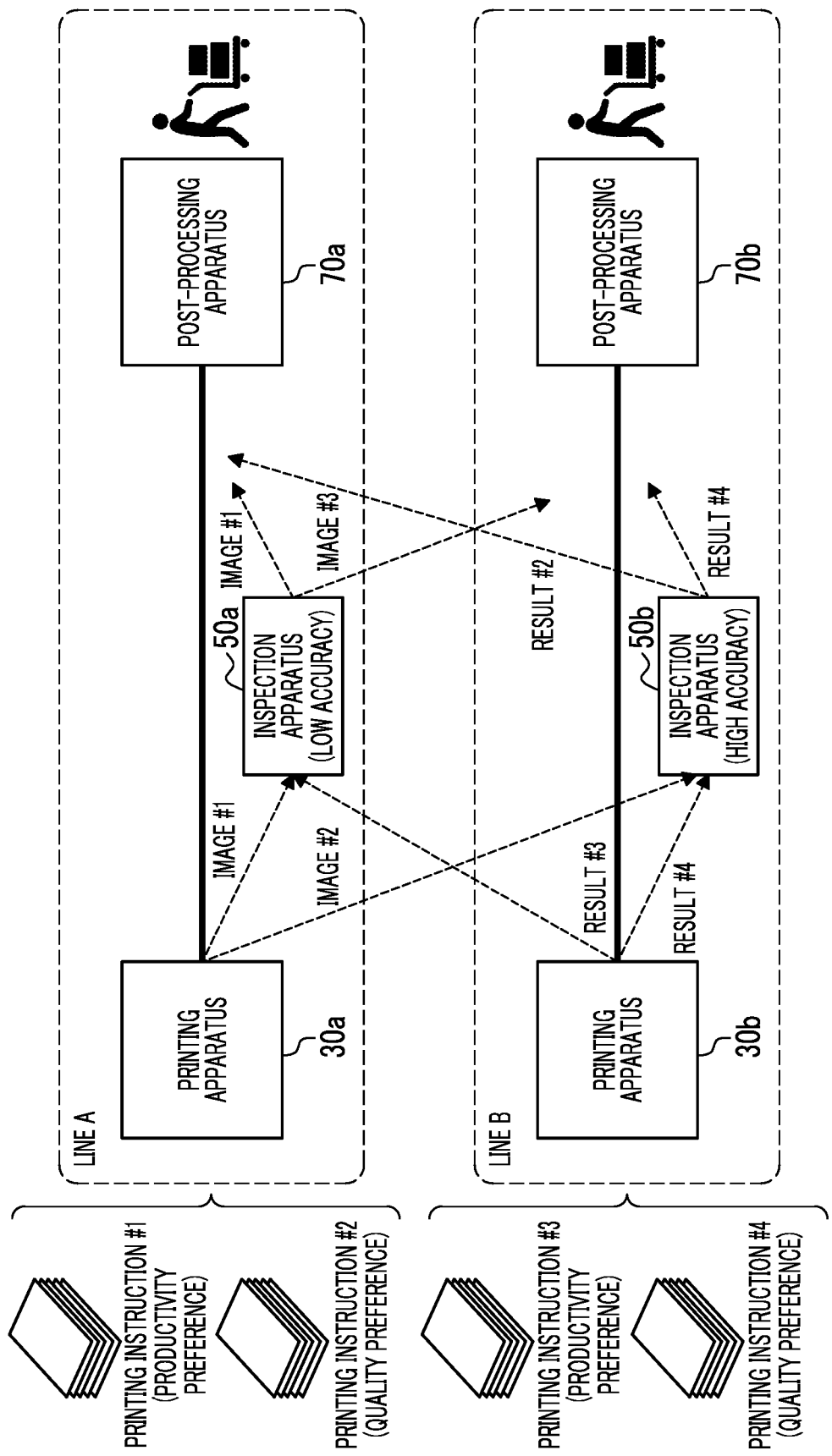
FIG. 5 is a diagram illustrating a specific example of a first operation of the printing system according to the exemplary embodiment of the present invention.
Figure 6:
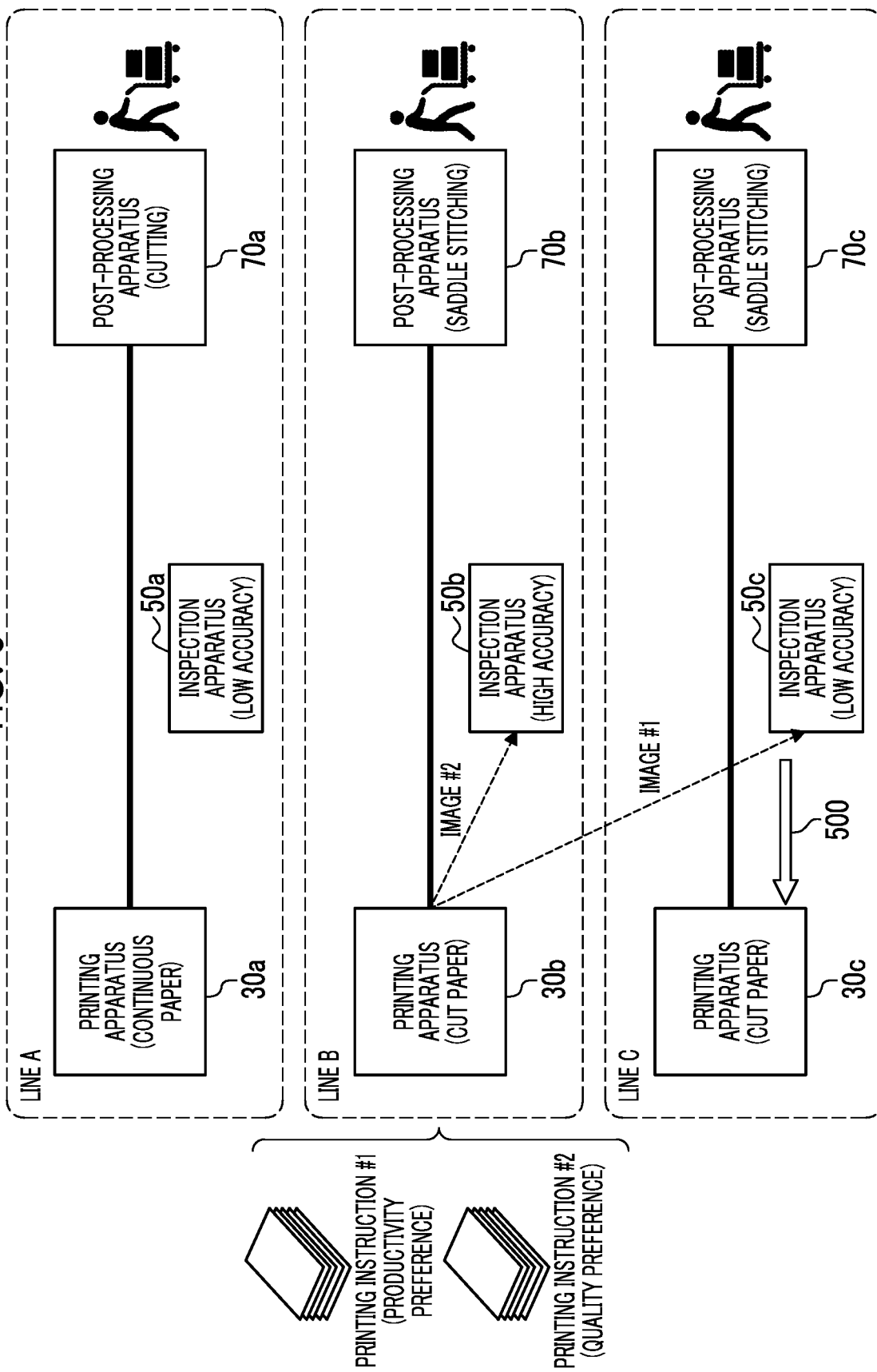
FIG. 6 is a diagram illustrating a specific example of a second operation of the printing system according to the exemplary embodiment of the present invention.
Figure 7:
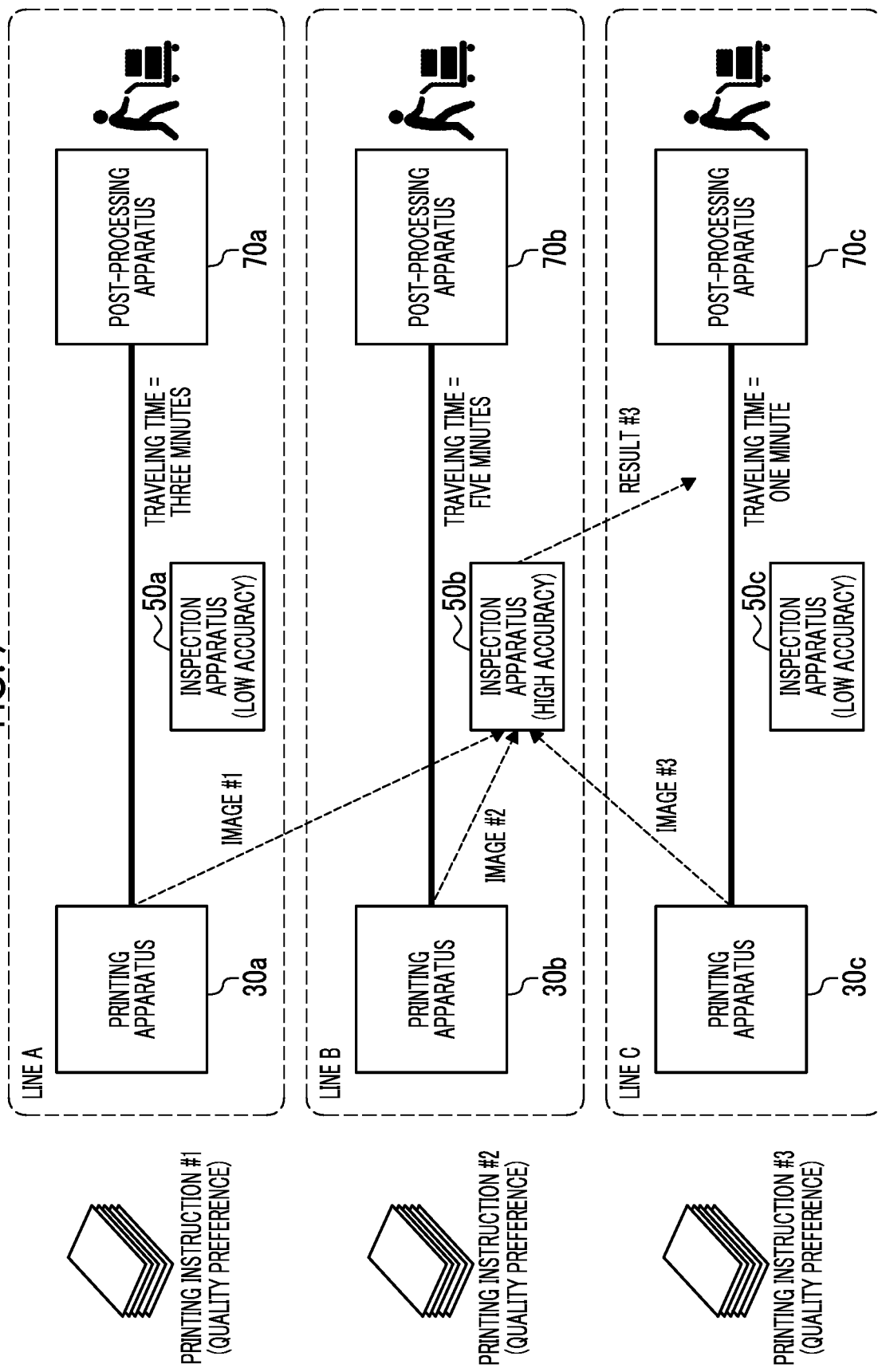
FIG. 7 is a diagram illustrating a specific example of a third operation of the printing system according to the exemplary embodiment of the present invention.

FIG. 5 to FIG. 7 are diagrams illustrating specific examples of an operation of the printing system 1 according to the present exemplary embodiment. Here, as an inspection accuracy of the inspection apparatus 50, "high accuracy" and "low accuracy" are exemplified. In addition, as a required quality, "productivity preference" and "quality preference" are exemplified. "productivity preference" is information indicating that a quality may be low in a case where a productivity is high, and "quality preference" is information indicating that a high quality is required. In the following, a specific example in which the inspection apparatus 50 for "high accuracy" performs an inspection of an image based on a printing instruction of "quality preference" and the inspection apparatus 50 for "low accuracy" performs an inspection of an image based on a printing instruction of "productivity preference" will be described.

FIG. 5 illustrates a specific example of a first operation of the printing system 1. In the first operation, the printing apparatus 30 selects the inspection apparatus 50 having an inspection accuracy satisfying a required quality which is set in a printing instruction, and requests the inspection apparatus 50 to perform an inspection. The inspection apparatus 50 that receives the request performs an inspection, and transmits an inspection result as a response to the line to which the printing apparatus 30 that requests the inspection belongs.

In FIG. 5, the inspection apparatus 50a is the inspection apparatus 50 having a low inspection accuracy, and the inspection apparatus 50b is the inspection apparatus 50 having a high inspection accuracy. Further, in FIG. 5, among printing instructions received by the printing apparatus 30a, a printing instruction #1 is a productivity-preference printing instruction, and a printing instruction #2 is a quality-preference printing instruction. Among printing instructions received by the printing apparatus 30b, a printing instruction #3 is a productivity-preference printing instruction, and a printing instruction #4 is a quality-preference printing instruction.

In this case, the printing apparatus 30a requests the inspection apparatus 50a having a low inspection accuracy to perform an inspection of an image #1 printed based on the printing instruction #1. Thereby, the inspection apparatus 50a performs an inspection of the image #1, and transmits, as a response, a result #1 which is an inspection result to the printing apparatus 30a. Further, the printing apparatus 30a requests the inspection apparatus 50b having a high inspection accuracy to perform an inspection of an image #2 printed based on the printing instruction #2. Thereby, the inspection apparatus 50b performs an inspection of the image #2, and transmits, as a response, a result #2 which is an inspection result to the printing apparatus 30a.

On the other hand, the printing apparatus 30b requests the inspection apparatus 50a having a low inspection accuracy to perform an inspection of an image #3 printed based on the printing instruction #3. Thereby, the inspection apparatus 50a performs an inspection of the image #3, and transmits, as a response, a result #3 which is an inspection result to the printing apparatus 30b. Further, the printing apparatus 30b requests the inspection apparatus 50b having a high inspection accuracy to perform an inspection of an image #4 printed based on the printing instruction #4. Thereby, the inspection apparatus 50b performs an inspection of the image #4, and transmits, as a response, a result #4 which is an inspection result to the printing apparatus 30b.

FIG. 6 illustrates a specific example of a second operation of the printing system 1. In the second operation, in a case where a plurality of selectable inspection apparatuses 50 exist, the printing apparatus 30 selects the inspection apparatus 50 of the line having the same configuration as the line to which the printing apparatus 30 belongs, and requests the selected inspection apparatus 50 to perform an inspection. The inspection apparatus 50 that receives the request performs an inspection. In a case where an abnormality occurs in the inspection result, the printing apparatus 30 of the line to which the inspection apparatus 50 belongs performs reprinting.

In FIG. 6, the inspection apparatus 50b is the inspection apparatus 50 having a high inspection accuracy, and the inspection apparatuses 50a and 50c are the inspection apparatuses 50 having the same low inspection accuracy. Further, in FIG. 6, the line A including the printing apparatus 30a and the post-processing apparatus 70a is a line including the printing apparatus 30 for performing printing on continuous paper and the post-processing apparatus 70 for performing cutting. The line B including the printing apparatus 30b and the post-processing apparatus 70b and the line C including the printing apparatus 30c and the post-processing apparatus 70c are both lines including the printing apparatus 30 for performing printing on cut paper and the post-processing apparatus 70 for performing saddle stitching. Further, in FIG. 6, among printing instructions received by the printing apparatus 30b, a printing instruction #1 is a productivity-preference printing instruction, and a printing instruction #2 is a quality-preference printing instruction.

In this case, the printing apparatus 30b requests, among the inspection apparatuses 50a and 50c having a low inspection accuracy, the inspection apparatus 50c of the line C to perform an inspection of an image #1 printed based on the printing instruction #1, the line C including the printing apparatus 30 that performs printing on cut paper and the post-processing apparatus 70 that performs saddle stitching as in the line B. Thereby, the inspection apparatus 50c performs an inspection of the image #1. At a time, in a case where an abnormality occurs in the inspection result, as illustrated by an arrow 500, the printing apparatus 30c of the line C performs reprinting based on the printing instruction #1.

Further, the printing apparatus 30b requests the inspection apparatus 50b having a high inspection accuracy to perform an inspection of an image #2 printed based on the printing instruction #2. Thereby, the inspection apparatus 50b performs an inspection of the image #2.

FIG. 7 illustrates a specific example of a third operation of the printing system 1. In the third operation, it is premised that the inspection apparatus 50 performs an inspection in requested units of paper. In a case where an inspection for a plurality of pieces of paper is requested, the inspection apparatus 50 performs the inspection from paper for which an execution deadline of a predetermined process is earlier or paper for which an executable time of a predetermined process is earlier.

In FIG. 7, the inspection apparatus 50b is the inspection apparatus 50 having a high inspection accuracy, and the inspection apparatuses 50a and 50c are the inspection apparatuses 50 having a low inspection accuracy. Further, in FIG. 7, a traveling time from the printing apparatus 30a to the post-processing apparatus 70a in the line A is three minutes, a traveling time from the printing apparatus 30b to the post-processing apparatus 70b in the line B is five minutes, and a traveling time from the printing apparatus 30c to the post-processing apparatus 70c in the line C is one minute. Further, in FIG. 7, the printing instruction #1 received by the printing apparatus 30a, the printing instruction #2 received by the printing apparatus 30b, and the printing instruction #3 received by the printing apparatus 30c are all quality-preference printing instructions.

In this case, the printing apparatus 30a requests the inspection apparatus 50b having a high inspection accuracy to perform an inspection of an image #1 printed based on the printing instruction #1. The printing apparatus 30b requests the inspection apparatus 50b having a high inspection accuracy to perform an inspection of an image #2 printed based on the printing instruction #2. The printing apparatus 30c requests the inspection apparatus 50b having a high inspection accuracy to perform an inspection of an image #3 printed based on the printing instruction #3. Thereby, the inspection apparatus 50b performs inspections of the images #1 to #3. At a time, since the traveling time from the printing apparatus 30c to the post-processing apparatus 70c in the line C is shortest, first, the inspection apparatus 50b performs an inspection of the image #3 requested by the printing apparatus 30c, and transmits, as a response, a result #3 which is an inspection result to the printing apparatus 30c.

Functional Configuration of Printing System

Figure 8:
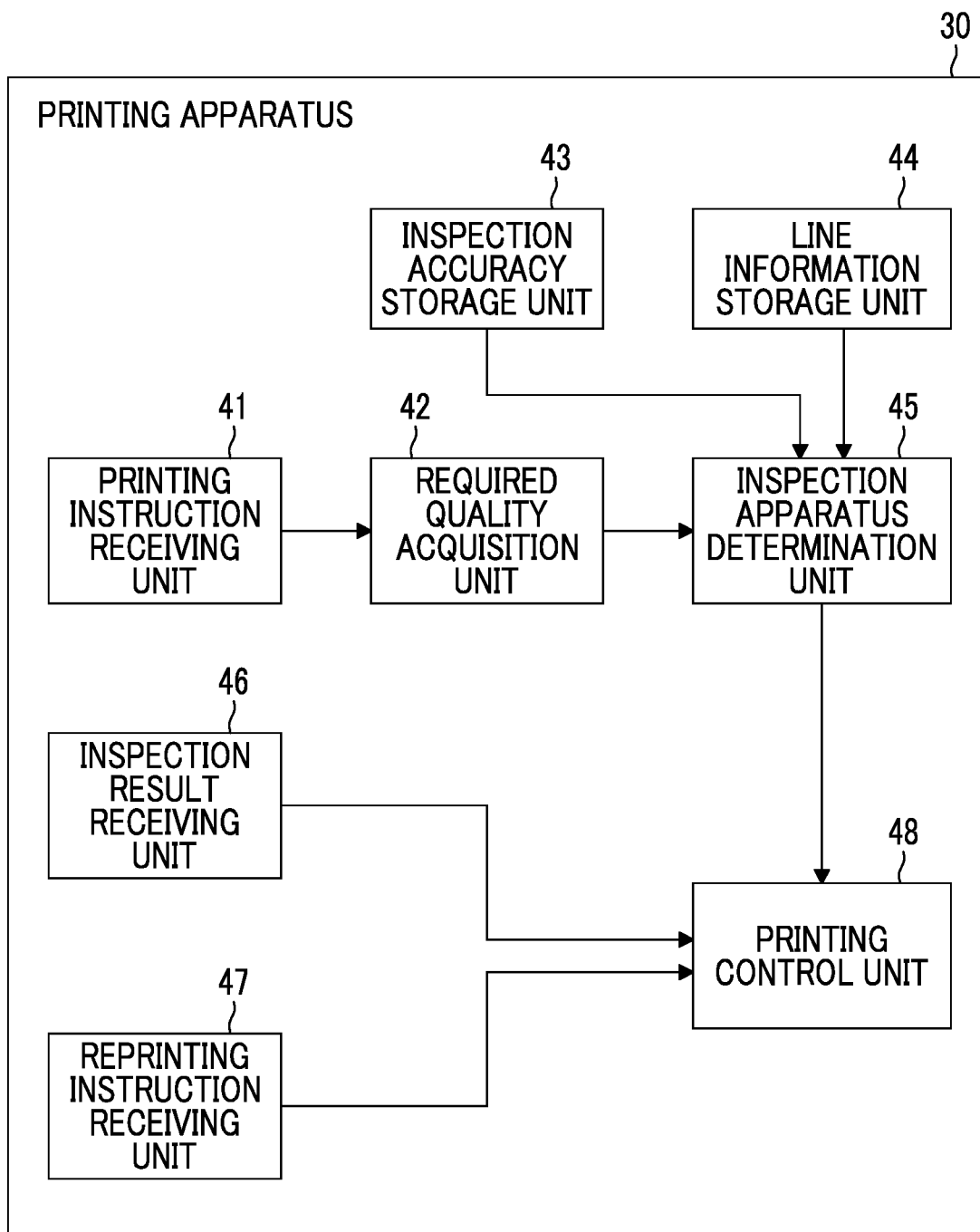
FIG. 8 is a block diagram illustrating a functional configuration example of the printing apparatus according to the exemplary embodiment of the present invention.

FIG. 8 is a block diagram illustrating a functional configuration example of the printing apparatus 30 according to the present exemplary embodiment. As illustrated in FIG. 8, the printing apparatus 30 includes a printing instruction receiving unit 41, a required quality acquisition unit 42, an inspection accuracy storage unit 43, a line information storage unit 44, an inspection apparatus determination unit 45, an inspection result receiving unit 46, a reprinting instruction receiving unit 47, and a printing control unit 48.

The printing instruction receiving unit 41 receives a printing instruction for the printing apparatus 30 from, for example, the workflow management apparatus 10. Here, it is assumed that a required quality is set in the printing instruction, the required quality being a quality required as a quality of a printed image. The printing instruction receiving unit 41 transmits the printing instruction to the required quality acquisition unit 42.

The required quality acquisition unit 42 acquires the required quality from the printing instruction transmitted from the printing instruction receiving unit 41. The required quality acquisition unit 42 transmits the printing instruction and the required quality to the inspection apparatus determination unit 45. In the present exemplary embodiment, as an example of processing of specifying the quality required for the print medium included in the product for which an instruction for production on a specific production line is given, processing in the required quality acquisition unit 42 is performed.

The inspection accuracy storage unit 43 stores the inspection accuracies of the plurality of inspection apparatuses 50. For example, the inspection accuracy storage unit 43 may store inspection apparatus information indicating the inspection apparatus 50 and the inspection accuracy of the inspection apparatus 50 in association with each other, for each of the plurality of inspection apparatuses 50. The inspection accuracy may be received from each inspection apparatus 50 at a time when the printing system 1 is configured or at a certain timing after the printing system 1 is configured. Alternatively, the inspection accuracy may be received from each inspection apparatus 50 in a case where the printing apparatus 30 receives the printing instruction.

The line information storage unit 44 stores line information on the plurality of lines. For example, the line information storage unit 44 may store the inspection apparatus information indicating the inspection apparatus 50 and the line information on the line to which the inspection apparatus 50 belongs in association with each other, for each of the plurality of inspection apparatuses 50. The line information includes information on a configuration of the line. The information on the configuration of the line is, for example, information on a type of an apparatus provided on the line. The lines may include the corresponding line and other lines. The line information may be received from each line at a time when the printing system. 1 is configured or at a certain timing after the printing system 1 is configured. Alternatively, the line information may be received from each line in a case where the printing apparatus 30 receives the printing instruction. In the present exemplary embodiment, the plurality of lines are used as an example of a plurality of production lines, and the corresponding line is used as an example of a specific production line among the plurality of production lines.

In the first operation, the inspection apparatus determination unit 45 determines the inspection apparatus 50 having the inspection accuracy satisfying the required quality, as the inspection apparatus 50 that is a destination of a request for an inspection of an image. In the present exemplary embodiment, as an example of processing of performing a control such that, among the plurality of inspection apparatuses provided on the plurality of production lines, one inspection apparatus having the inspection accuracy according to the quality required for the print medium performs an inspection of the print medium, processing in the inspection apparatus determination unit 45 is performed.

Further, in the second operation, the inspection apparatus determination unit 45 determines the inspection apparatus 50 that has the inspection accuracy satisfying the required quality and is provided on the line having the same or similar configuration as the corresponding line, as the inspection apparatus 50 that is a destination of a request for an inspection of an image. Here, the line having the same or similar configuration as the corresponding line may be, for example, a line to which the printing apparatus 30 same as or similar to the printing apparatus 30 of the corresponding line belongs. Alternatively, the line having the same or similar configuration as the corresponding line may be, for example, a line to which the post-processing apparatus 70 same as or similar to the post-processing apparatus 70 of the corresponding line belongs. In the present exemplary embodiment, in a case where at least two inspection apparatuses have inspection accuracies according to the quality required for the print medium, as an example of processing of selecting, from the at least two inspection apparatuses, as one inspection apparatus, an inspection apparatus provided on another production line including a printing apparatus that performs printing on the print medium and is same as or similar to a printing apparatus of the specific line, processing in the inspection apparatus determination unit 45 is performed. Further, in the present exemplary embodiment, as an example of processing of selecting, from the at least two inspection apparatuses, as one inspection apparatus, an inspection apparatus provided on another production line further including a processing apparatus that processes the print medium and is same as or similar to a processing apparatus of the specific line, processing in the inspection apparatus determination unit 45 is performed.

The inspection apparatus determination unit 45 transmits, to the printing control unit 48, the printing instruction transmitted from the required quality acquisition unit 42 and the inspection apparatus information indicating the inspection apparatus 50 determined as a destination of a request for an inspection of an image.

The inspection result receiving unit 46 receives an inspection result from the inspection apparatus 50. Here, the inspection result is information indicating whether the image transmitted by the printing control unit 48 to the inspection apparatus 50 is normal or abnormal, as will be described later.

In a case where the inspection apparatus 50 of the corresponding line is selected as a destination of a request for an inspection of an image and the inspection result of the image by the inspection apparatus 50 is abnormal, the reprinting instruction receiving unit 47 receives a reprinting instruction from the inspection apparatus 50. Here, the reprinting instruction is an instruction for reprinting based on a rasterized image received as the reference image by the inspection apparatus 50 of the corresponding line. Therefore, the reprinting instruction includes a rasterized image. In the present exemplary embodiment, in a case where a defect of the print medium is detected by one inspection apparatus, as an example of processing of performing a control such that a printing apparatus on another production line including a printing apparatus that is same as or similar to a printing apparatus of the specific line performs reprinting on the print medium, processing in the reprinting instruction receiving unit 47 is performed.

In a case where the printing instruction receiving unit 41 receives a printing instruction, the printing control unit 48 generates a rasterized image obtained by rasterizing the printing instruction. Next, the printing control unit 48 transmits the rasterized image as a reference image to the inspection apparatus 50 indicated by the inspection apparatus information transmitted from the inspection apparatus determination unit 45. Next, the printing control unit 48 instructs the printing unit 36 to perform printing based on the printing instruction transmitted from the inspection apparatus determination unit 45, and acquires a read image from the reading unit 37 in a case where the printed image is read by the reading unit 37. The printing control unit 48 transmits the read image acquired from the reading unit 37 to the inspection apparatus 50 indicated by the inspection apparatus information transmitted from the inspection apparatus determination unit 45.

Further, in a case where the inspection result receiving unit 46 receives the inspection result, the printing control unit 48 instructs the printing unit 36 to perform paper transport in a normal mode in a case where the inspection result is normal, and instructs the printing unit 36 to perform paper transport in an abnormal mode in a case where the inspection result is abnormal. Here, as the paper transport in the normal mode, for example, it is considered to transport the paper on which the image is printed based on the printing instruction to the post-processing apparatus 70. As the paper transport in the abnormal mode, for example, it is considered to discharge the paper on which the image is printed based on the printing instruction to a discharge destination for paper on which abnormality occurs, or transport the paper to a discarding apparatus for discarding paper.

Further, in a case where the reprinting instruction receiving unit 47 receives the reprinting instruction, the printing control unit 48 instructs the printing unit 36 to perform reprinting based on the rasterized image included in the reprinting instruction.

Figure 9:
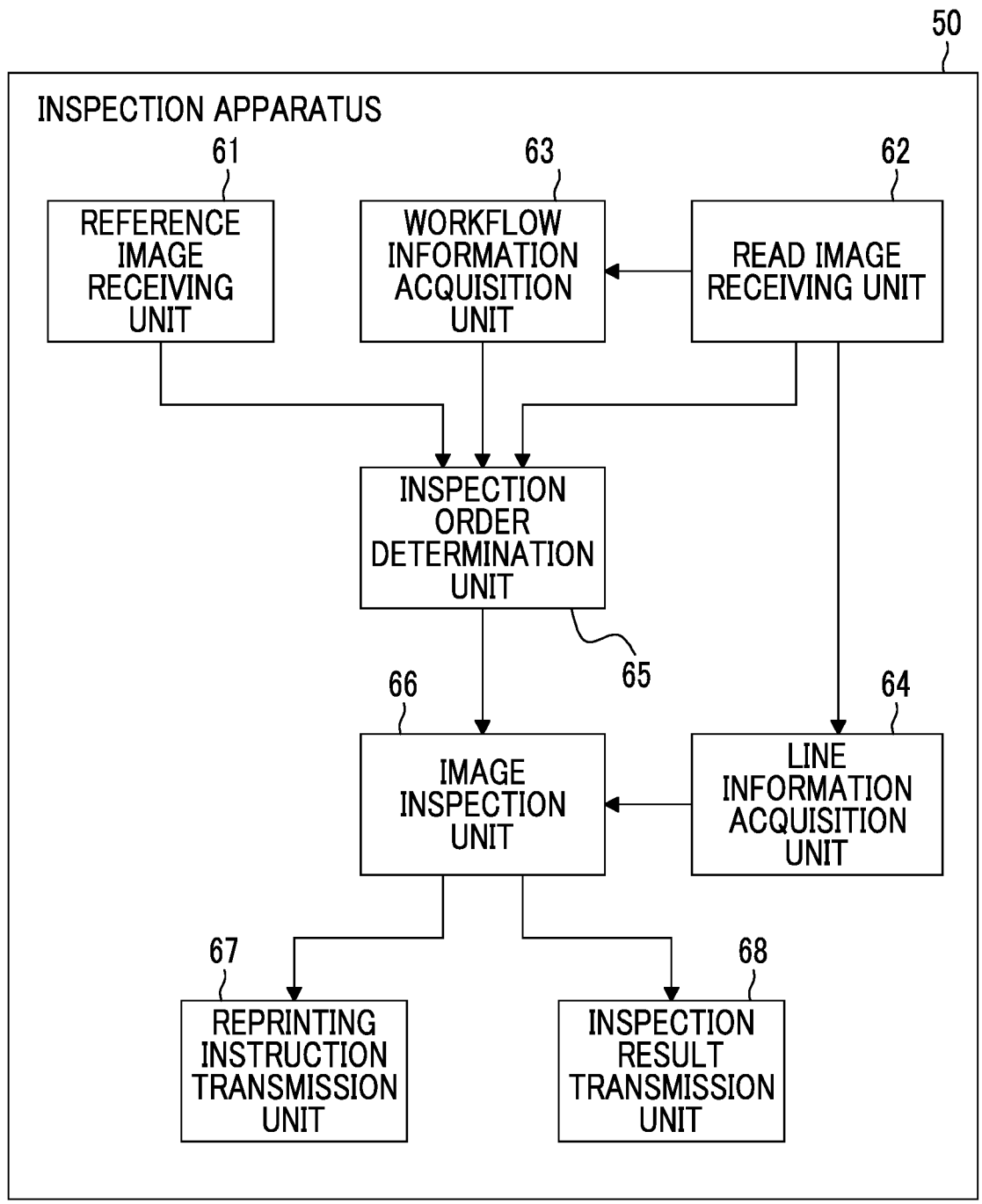
FIG. 9 is a block diagram illustrating a functional configuration example of the inspection apparatus according to the exemplary embodiment of the present invention.

FIG. 9 is a block diagram illustrating a functional configuration example of the inspection apparatus 50 according to the present exemplary embodiment. As illustrated in FIG. 9, the inspection apparatus 50 includes a reference image receiving unit 61, a read image receiving unit 62, a workflow information acquisition unit 63, a line information acquisition unit 64, an inspection order determination unit 65, an image inspection unit 66, a reprinting instruction transmission unit 67, and an inspection result transmission unit 68.

The reference image receiving unit 61 receives the reference image transmitted by the printing control unit 48 of the printing apparatus 30. The reference image receiving unit 61 transmits the reference image to the inspection order determination unit 65.

The read image receiving unit 62 receives the read image transmitted by the printing control unit 48 of the printing apparatus 30. Here, it is assumed that workflow information managed by the workflow management apparatus 10 and line information on a line as a transmission source of the read image are set in the read image.

In these pieces of information, the workflow information includes time information of the workflow of the line as a transmission source of the read image. The time information may be information on an execution deadline of a predetermined process. In this case, the predetermined process may be a process of shipping a product. For example, in a case where the predetermined process is a process of shipping a product, a scheduled shipping time of a printed matter is an example of information on an execution deadline of the predetermined process. Further, the time information may be information on an executable time of the predetermined process. In this case, the predetermined process may be a process of shipping a product or a process of processing a print medium. For example, the traveling time illustrated in FIG. 7 indicates an executable time of post-processing on the paper on which the image is printed. Thus, in a case where the predetermined process is a process of processing a print medium, the traveling time is an example of information on an executable time of the predetermined process.

Further, the line information includes information on a configuration of the line. The information on the configuration of the line is, for example, information on a type of an apparatus provided on the line. The lines may include the corresponding line and other lines.

The read image receiving unit 62 transmits the read image to the workflow information acquisition unit 63, the line information acquisition unit 64, and the inspection order determination unit 65.

The workflow information acquisition unit 63 acquires workflow information from the read image transmitted from the read image receiving unit 62. The workflow information acquisition unit 63 transmits the workflow information to the inspection order determination unit 65.

The line information acquisition unit 64 acquires line information from the read image transmitted from the read image receiving unit 62. The line information acquisition unit 64 transmits the line information to the image inspection unit 66.

In a case where the reference image receiving unit 61 and the read image receiving unit 62 respectively receive the reference image and the read image which are transmitted from the plurality of printing apparatuses 30, the inspection order determination unit 65 determines an inspection order as to which inspection is to be first performed using the reference image and the read image. In a case where the inspection apparatus 50 periodically operates in a predetermined short cycle, for example, the inspection order determination unit 65 may determine whether or not the reference image and the read image are received from the plurality of printing apparatuses 30 based on whether or not there are a plurality of transmission sources of the reference image and the read image from a previous operation to a current operation. Further, the inspection order determination unit 65 determines the inspection order based on the workflow information transmitted from the workflow information acquisition unit 63. For example, in a case where the time information included in the workflow information indicates that the execution deadline or the executable time of the predetermined process related to the paper on which the image is printed is earlier, the inspection order determination unit 65 may determine the inspection order such that the inspection of the image is first performed. The inspection order determination unit 65 transmits the reference image and the read image to the image inspection unit 66, and also transmits the inspection order to the image inspection unit 66 in a case where the inspection order is determined. In the present exemplary embodiment, in a case where one inspection apparatus is controlled to perform inspections of a plurality of print mediums printed on the plurality of production lines, as an example of processing of performing a control such that the one inspection apparatus performs inspections of the plurality of print mediums in an order according to time information on the plurality of production lines, processing in the inspection order determination unit 65 is performed.

The image inspection unit 66 performs an inspection of the image printed by the printing apparatus 30 based on the printing instruction by comparing the reference image and the read image which are transmitted from the inspection order determination unit 65. At that time, in a case where the inspection order is transmitted from the inspection order determination unit 65, the image inspection unit 66 performs an inspection of the image in the inspection order. Further, the image inspection unit 66 determines whether the inspection result of the image is normal or abnormal. For example, the image inspection unit 66 may determine that the inspection result is normal in a case where a matching degree between the reference image and the read image is equal to or higher than a predetermined reference, and may determine that the inspection result is abnormal in a case where a matching degree between the reference image and the read image is lower than a predetermined reference. Further, in a case where the inspection result of the image is abnormal, the image inspection unit 66 determines whether or not the corresponding line has the same or similar configuration as the line as a source of the request for the inspection of the image, based on the line information transmitted from the line information acquisition unit 64. In a case where the inspection result of the image is abnormal and the corresponding line has the same or similar configuration as the line as a source of the request for the inspection of the image, the image inspection unit 66 instructs the reprinting instruction transmission unit 67 to transmit a reprinting instruction. Further, in a case where the inspection result of the image is normal, or in a case where the inspection result of the image is abnormal and the corresponding line does not have the same or similar configuration as the line as a source of the request for the inspection of the image, the image inspection unit 66 instructs the inspection result transmission unit 68 to transmit the inspection result.

The reprinting instruction transmission unit 67 transmits a reprinting instruction to the printing apparatus 30 of the corresponding line. Here, as described above, the reprinting instruction is an instruction for reprinting based on a rasterized image received as the reference image by the inspection apparatus 50 of the corresponding line. Therefore, the reprinting instruction includes a rasterized image.

The inspection result transmission unit 68 transmits the inspection result of the image that is obtained by the image inspection unit 66 to the printing apparatus 30 as a source of the request for the inspection of the image.

Operation Example of Printing System

Figure 10:
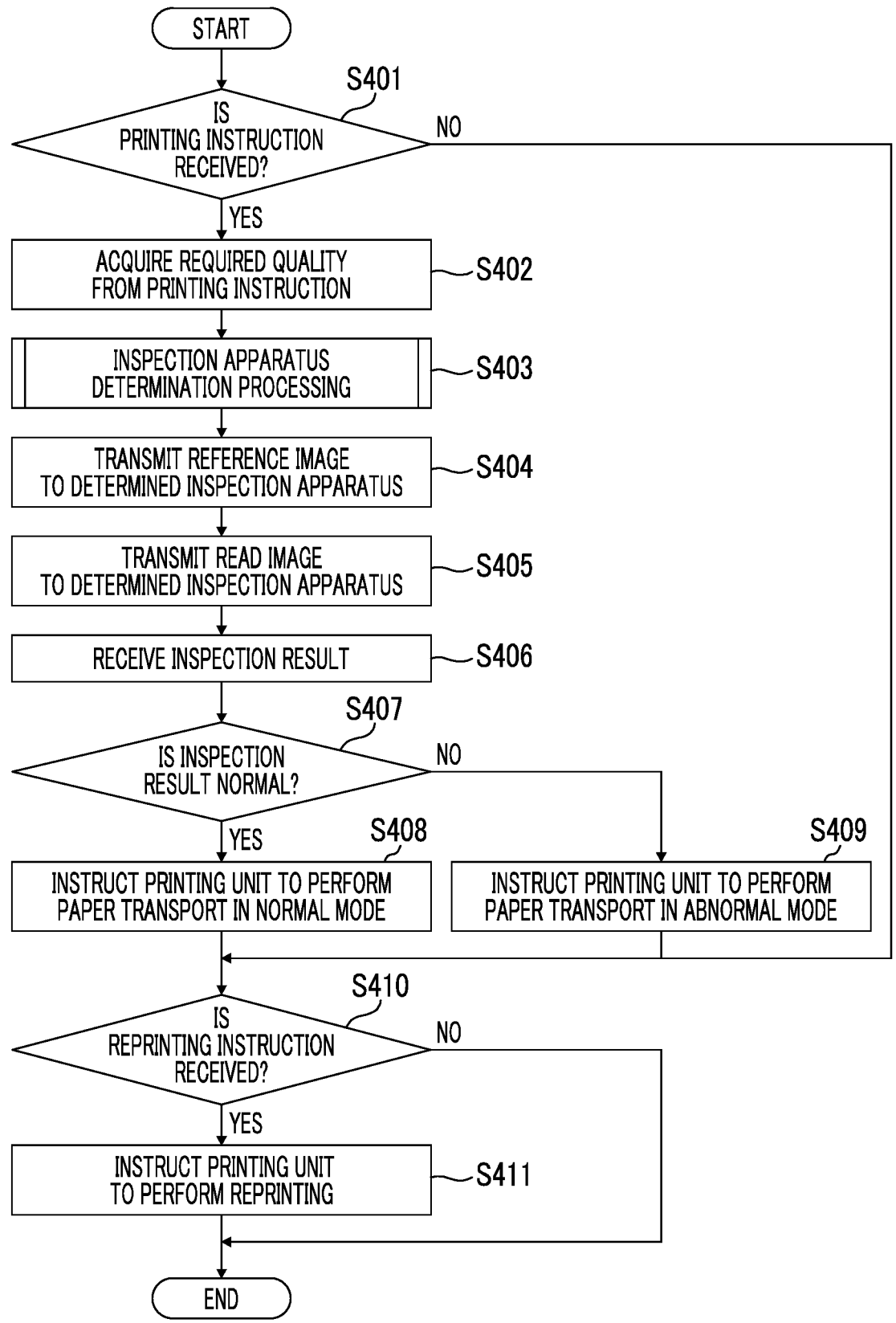
FIG. 10 is a flowchart illustrating an operation example of the printing apparatus according to the exemplary embodiment of the present invention.

FIG. 10 is a flowchart illustrating an operation example of the printing apparatus 30 according to the present exemplary embodiment. It is assumed that the operation example is periodically executed in a predetermined short cycle.

As illustrated in FIG. 10, in the printing apparatus 30, first, the printing instruction receiving unit 41 determines whether or not a printing instruction is received (step S401).

In a case where it is determined in step S401 that a printing instruction is received, the required quality acquisition unit 42 acquires a required quality from the printing instruction (step S402).

Next, the inspection apparatus determination unit 45 executes inspection apparatus determination processing of determining the inspection apparatus 50 for requesting an inspection of an image based on the printing instruction received in step S401 (step S403).

Next, the printing control unit 48 transmits a reference image, which is a rasterized image based on the printing instruction received in step S401, to the inspection apparatus 50 determined in the inspection apparatus determination processing of step S403 (step S404). Further, the printing control unit 48 outputs the rasterized image to the printing unit 36, and in a case where the reading unit 37 reads an image printed on paper based on the rasterized image by the printing unit 36, transmits the read image to the inspection apparatus 50 determined in the inspection apparatus determination processing of step S403 (step S405).

Thereafter, the inspection result receiving unit 46 receives an inspection result from the inspection apparatus 50 that is a transmission destination of the reference image in step S404 and is a transmission destination of the read image in step S405 (step S406). The inspection result receiving unit 46 determines whether or not the inspection result received in step S406 is normal (step S407).

In a case where it is determined in step S407 that the inspection result is normal, the printing control unit 48 instructs the printing unit 36 to perform paper transport in a case where the inspection result is normal (step S408). On the other hand, in a case where it is determined in step S407 that the inspection result is not normal, that is, the inspection result is abnormal, the printing control unit 48 instructs the printing unit 36 to perform paper transport in a case where the inspection result is abnormal (step S409). The printing apparatus 30 proceeds to processing of step S410.

On the other hand, in a case where it is determined in step S401 that a printing instruction is not received, the printing apparatus 30 proceeds to processing of step S410 without executing processing of step S402 to step S409.

Next, in the printing apparatus 30, the reprinting instruction receiving unit 47 determines whether or not a reprinting instruction is received from the inspection apparatus 50 (step S410). Here, it is assumed that the reprinting instruction includes the rasterized image transmitted as the reference image from a certain printing apparatus 30.

In a case where it is determined in step S410 that the reprinting instruction is received, the printing control unit 48 instructs the printing unit 36 to perform reprinting by outputting the rasterized image included in the reprinting instruction to the printing unit 36 (step S411).

On the other hand, in a case where it is determined in step S410 that the reprinting instruction is not received, the printing apparatus 30 ends processing without executing step S411.

Figure 11:
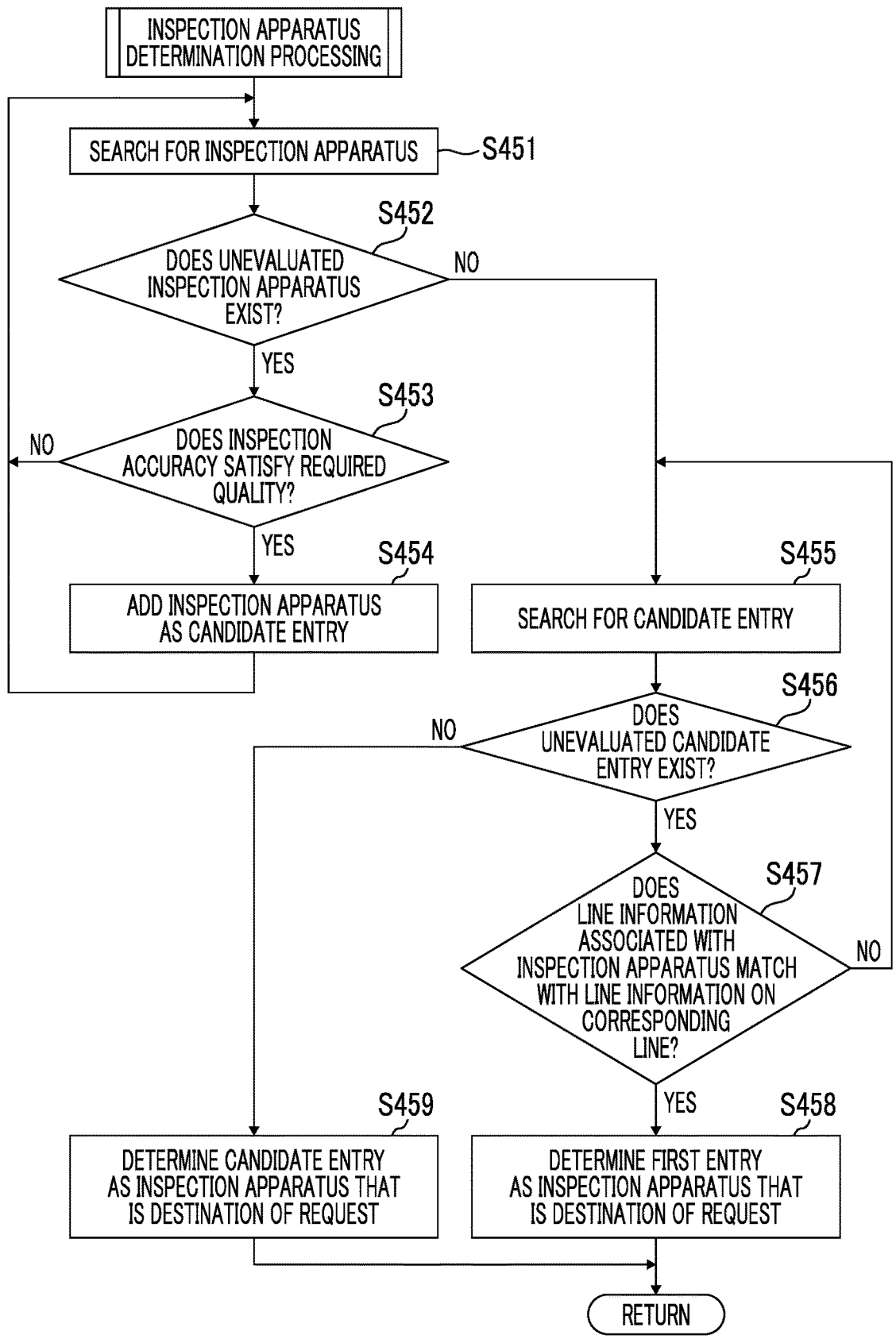
FIG. 11 is a flowchart illustrating a flow of inspection apparatus determination processing.

FIG. 11 is a flowchart illustrating a flow of the inspection apparatus determination processing of step S403 of FIG. 10. Prior to this operation example, it is assumed that the inspection accuracy storage unit 43 stores the inspection accuracy of each of the plurality of inspection apparatuses 50 and that the line information storage unit 44 stores the line information on the line to which the inspection apparatus 50 belongs for each of the plurality of inspection apparatuses 50.

As illustrated in FIG. 11, first, the inspection apparatus determination unit 45 searches for the inspection apparatus 50 from the inspection accuracy storage unit 43 (step S451). The inspection apparatus determination unit 45 determines whether or not an unevaluated inspection apparatus 50 exists (step S452).

In a case where it is determined in step S452 that an unevaluated inspection apparatus 50 exists, the inspection apparatus determination unit 45 determines whether or not the inspection accuracy associated with the inspection apparatus 50 satisfies the required quality acquired in step S402 of FIG. 10 (step S453).

In a case where it is determined in step S453 that the inspection accuracy satisfies the required quality, the inspection apparatus determination unit 45 adds the inspection apparatus 50 as a candidate entry to an inspection apparatus list (step S454), and returns to processing of step S451.

On the other hand, in a case where it is determined in step S453 that the inspection accuracy does not satisfy the required quality, the inspection apparatus determination unit 45 returns to processing of step S451 without adding the inspection apparatus 50 to the inspection apparatus list.

Thereafter, the inspection apparatus determination unit 45 repeats processing of step S451 to step S454 until an unevaluated inspection apparatus 50 does not exist in the inspection accuracy storage unit 43. In a case where it is determined in step S452 that an unevaluated inspection apparatus 50 does not exist, the inspection apparatus determination unit 45 searches for a candidate entry from the inspection apparatus list created in step S454 (step S455). The inspection apparatus determination unit 45 determines whether or not an unevaluated candidate entry exists (step S456).

In a case where it is determined in step S456 that an unevaluated candidate entry exists, the inspection apparatus determination unit 45 determines whether or not the line information associated with the inspection apparatus 50 as the candidate entry matches with the line information on the corresponding line (step S457).

In a case where it is determined in step S457 that the line information associated with the inspection apparatus 50 does not match with the line information on the corresponding line, the inspection apparatus determination unit 45 repeats processing of step S455 to step S457 until an unevaluated candidate entry does not exist in the inspection apparatus list. In a case where it is determined in step S457 that the line information associated with the inspection apparatus 50 matches with the line information on the corresponding line, the inspection apparatus determination unit 45 determines, as the inspection apparatus 50 that is a destination of a request for an inspection of an image, the inspection apparatus 50 as the candidate entry of interest at that time (step S458), and returns to processing of FIG. 10.

On the other hand, in a case where it is determined in step S456 that an unevaluated candidate entry does not exist, the inspection apparatus determination unit 45 determines, as the inspection apparatus 50 that is a destination of a request for an inspection of an image, the inspection apparatus 50 as a first entry in the inspection apparatus list which is created in step S454 (step S459), and returns to processing of FIG. 10.

Figure 12:
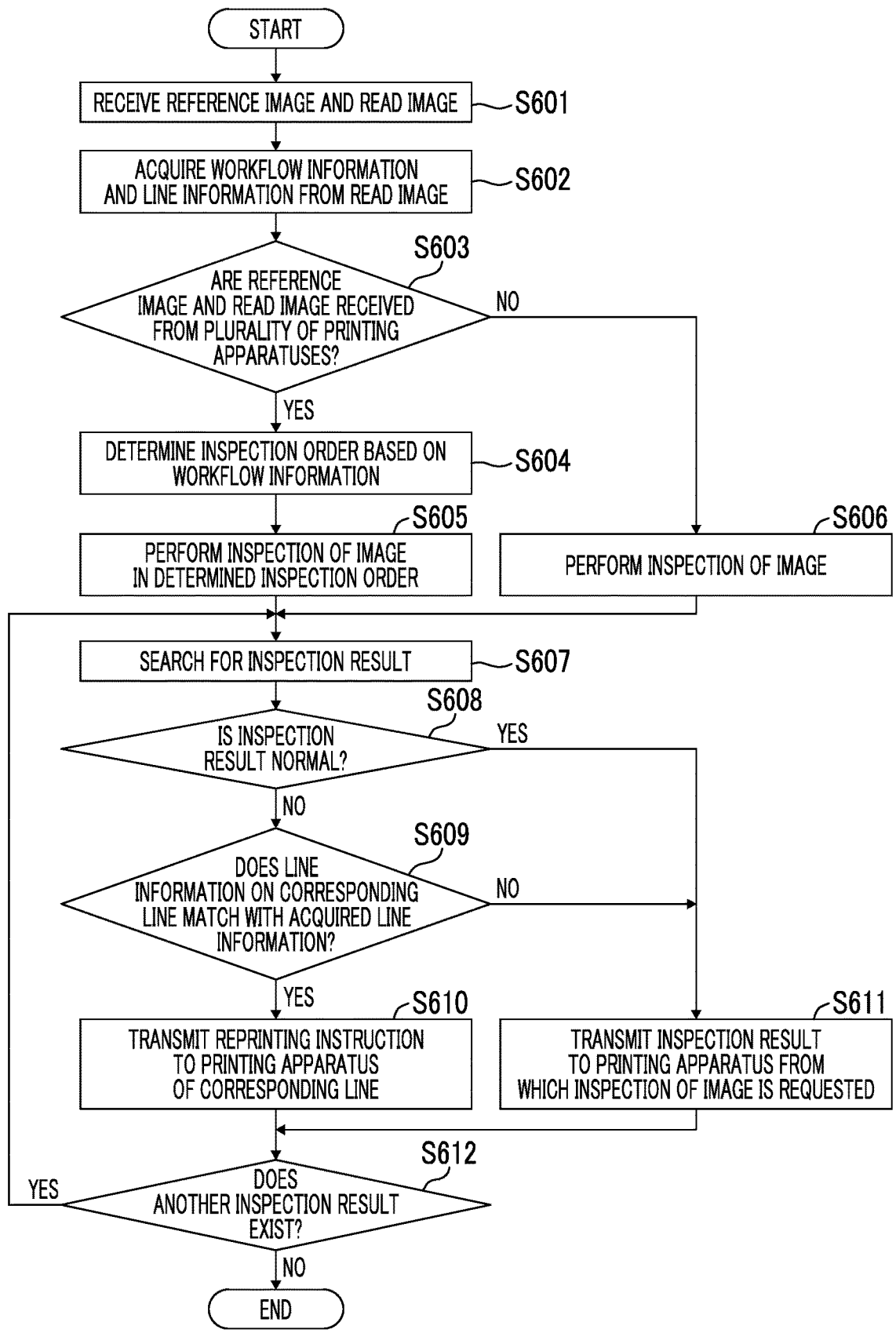
FIG. 12 is a flowchart illustrating an operation example of the inspection apparatus according to the exemplary embodiment of the present invention.

FIG. 12 is a flowchart illustrating an operation example of the inspection apparatus 50 according to the present exemplary embodiment. It is assumed that the operation example is periodically executed in a predetermined short time interval.

As illustrated in FIG. 12, in the inspection apparatus 50, first, the reference image receiving unit 61 receives the reference image from the printing apparatus 30, and the read image receiving unit 62 receives the read image from the printing apparatus 30 (step S601). The workflow information acquisition unit 63 acquires the workflow information from the read image received in step S601, and the line information acquisition unit 64 acquires the line information from the read image received in step S601 (step S602).

Next, the inspection order determination unit 65 determines whether or not the reference image and the read image are received from the plurality of printing apparatuses 30 in step S601 (step S603). Specifically, the inspection order determination unit 65 performs a determination as described above for the reference images and the read images which are received from a previous execution time to a current execution time.

In a case where it is determined in step S603 that the reference image and the read image are received from the plurality of printing apparatuses 30, the inspection order determination unit 65 determines an inspection order of the images based on the workflow information acquired in step S602 (step S604).

Next, the image inspection unit 66 performs an inspection of an image by comparing the reference image and the read image received in step S601 in an order according to the inspection order determined in step S604 (step S605), and proceeds to processing of step S607.

On the other hand, in a case where it is determined in step S603 that the reference image and the read image are not received from the plurality of printing apparatuses 30, it is determined that the reference image and the read image are received from one printing apparatus 30. In this case, there is only one set of the reference image and the read image received in step S601. Thus, the image inspection unit 66 performs an inspection of an image by comparing the reference image and the read image (step S606), and proceeds to processing of step S607.

Thereafter, the image inspection unit 66 searches for one inspection result from inspection results of the plurality of images (step S607). Here, in a case where an inspection of an image is performed in step S605, a plurality of inspection results are obtained. For this reason, the inspection results of the plurality of images are searched. On the other hand, in a case where an inspection of an image is performed in step S606, only one inspection result is obtained.

Next, the image inspection unit 66 determines whether or not the inspection result searched in step S607 is normal (step S608).

In a case where it is determined in step S608 that the inspection result is not normal, it is determined that the inspection result is abnormal. In this case, the image inspection unit 66 determines whether or not the line information on the corresponding line matches with the line information acquired in step S602 (step S609).

In a case where it is determined in step S609 that the line information on the corresponding line matches with the acquired line information, the reprinting instruction transmission unit 67 transmits a reprinting instruction to the printing apparatus 30 of the corresponding line (step S610).

On the other hand, in a case where it is determined in step S608 that the inspection result is normal, or in a case where it is determined in step S609 that the line information on the corresponding line does not match with the acquired line information, the inspection result transmission unit 68 transmits the inspection result to the printing apparatus 30 from which the inspection of the image is requested (step S611).

Thereafter, the image inspection unit 66 determines whether or not another inspection result exists (step S612). In a case where it is determined that another inspection result exists, processing returns to step S607, and in a case where it is determined that another inspection result does not exist, processing is ended.

Modification Example

In the present exemplary embodiment, the workflow management apparatus 10 may include a part of the function of the printing apparatus 30 illustrated in FIG. 8 and a part of the function of the inspection apparatus 50 illustrated in FIG. 9. The workflow management apparatus 10 may execute a part of the operation of the printing apparatus 30 illustrated in FIG. 10 and FIG. 11 and a part of the operation of the inspection apparatus 50 illustrated in FIG. 12.

Specifically, the workflow management apparatus 10 may include at least the printing instruction receiving unit 41, the required quality acquisition unit 42, the inspection apparatus determination unit 45, and the reprinting instruction receiving unit 47 of FIG. 8.

In this case, processing performed by the required quality acquisition unit 42 of the workflow management apparatus 10 corresponds to an example of processing of specifying a quality required for a print medium included in a product for which an instruction for production on a specific production line is given.

Further, processing performed by the inspection apparatus determination unit 45 of the workflow management apparatus 10 corresponds to an example of processing of performing a control such that one inspection apparatus having an inspection accuracy according to the quality performs an inspection of the print medium, the one inspection apparatus being included in a plurality of inspection apparatuses provided on the plurality of production lines; selecting, from at least two inspection apparatuses, as the one inspection apparatus, an inspection apparatus provided on another production line including a printing apparatus that performs printing on the print medium and is same as or similar to a printing apparatus of the specific line, in a case where the at least two inspection apparatuses have inspection accuracies according to the quality required for the print medium; and selecting, from the at least two inspection apparatuses, as the one inspection apparatus, an inspection apparatus provided on another production line further including a processing apparatus that processes the print medium and is same as or similar to a processing apparatus of the specific line.

Further, in a case where a defect of the print medium is detected by one inspection apparatus, processing performed by the reprinting instruction receiving unit 47 of the workflow management apparatus 10 corresponds to an example of processing of performing a control such that a printing apparatus on another production line including a printing apparatus that is same as or similar to a printing apparatus of the specific line performs reprinting on the print medium.

Further, the workflow management apparatus 10 may include at least the inspection order determination unit 65 of FIG. 9.

In this case, in a case where one inspection apparatus is controlled to perform inspections of a plurality of print mediums printed on the plurality of production lines, processing performed by the inspection order determination unit 65 of the workflow management apparatus 10 corresponds to an example of processing of performing a control such that the one inspection apparatus performs inspections of the plurality of print mediums in an order according to time information on the plurality of production lines.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processing performed by the workflow management apparatus 10 or the printing apparatus 30 according to the present exemplary embodiment is prepared as, for example, a program such as application software.

In this case, the program for realizing the present exemplary embodiment is regarded as a program causing a computer to realize functions of specifying a quality required for a print medium included in a product for which an instruction for production on a specific production line among a plurality of production lines is given, and performing a control such that one inspection apparatus having an inspection accuracy according to the quality performs an inspection of the print medium, the one inspection apparatus being included in a plurality of inspection apparatuses provided on the plurality of production lines.

Further, the processing performed by the workflow management apparatus 10 or the inspection apparatus 50 according to the present exemplary embodiment is prepared as, for example, a program such as application software.

In this case, the program for realizing the present exemplary embodiment is regarded as a program causing a computer to realize a function of performing a control such that the one inspection apparatus performs inspections of the plurality of print mediums in an order according to time information on the plurality of production lines in a case where the one inspection apparatus is controlled to perform inspections of the plurality of print mediums printed on the plurality of production lines.

Further, a program for realizing the present exemplary embodiment may be provided not only by communication means but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
specify a quality required for a print medium included in a product for which an instruction for production on a specific production line among a plurality of production lines is given; and
perform a control such that one inspection apparatus having an inspection accuracy according to the quality performs an inspection of the print medium, the one inspection apparatus being included in a plurality of inspection apparatuses provided on the plurality of production lines,
select, from at least two inspection apparatuses, as the one inspection apparatus, an inspection apparatus provided on another production line including a printing apparatus that performs printing on the print medium and is same as or similar to a printing apparatus of the specific line, in a case where the at least two inspection apparatuses have inspection accuracies according to the quality.

2. The information processing apparatus according to claim 1, wherein the processor is configured to:
select, from the at least two inspection apparatuses, as the one inspection apparatus, an inspection apparatus provided on the other production line further including a processing apparatus that processes the print medium and is same as or similar to a processing apparatus of the specific line.

3. The information processing apparatus according to claim 1, wherein the processor is configured to:
perform a control such that the printing apparatus on the other production line performs reprinting on the print medium, in a case where a defect of the print medium is detected by the one inspection apparatus.

4. An information processing apparatus comprising:
a processor configured to:
specify a quality required for a print medium included in a product for which an instruction for production on a specific production line among a plurality of production lines is given; and
perform a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
wherein the time information is information on an execution deadline of a predetermined process,
wherein the predetermined process is a process of shipping the product.

5. An information processing apparatus comprising:
a processor configured to:
specify a quality required for a print medium included in a product for which an instruction for production on a specific production line among a plurality of production lines is given; and
perform a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
wherein the time information is information on an executable time of a predetermined process,
wherein the predetermined process is a process of shipping the product.

6. The information processing apparatus according to claim 5, wherein the predetermined process is a process of processing the print medium.

7. A non-transitory computer readable medium storing a program causing a computer to realize functions of:
specifying a quality required for a print medium included in a product for which an instruction for production on a specific production line among a plurality of production lines is given; and
performing a control such that one inspection apparatus having an inspection accuracy according to the quality performs an inspection of the print medium, the one inspection apparatus being included in a plurality of inspection apparatuses provided on the plurality of production lines,
selecting, from at least two inspection apparatuses, as the one inspection apparatus, an inspection apparatus provided on another production line including a printing apparatus that performs printing on the print medium and is same as or similar to a printing apparatus of the specific line, in a case where the at least two inspection apparatuses have inspection accuracies according to the quality.

8. An information processing method comprising:
specifying a quality required for a print medium included in a product for which an instruction for production on a specific production line among a plurality of production lines is given; and
performing a control such that one inspection apparatus having an inspection accuracy according to the quality performs an inspection of the print medium, the one inspection apparatus being included in a plurality of inspection apparatuses provided on the plurality of production lines,
selecting, from at least two inspection apparatuses, as the one inspection apparatus, an inspection apparatus provided on another production line including a printing apparatus that performs printing on the print medium and is same as or similar to a printing apparatus of the specific line, in a case where the at least two inspection apparatuses have inspection accuracies according to the quality.

9. A non-transitory computer readable medium storing a program causing a computer to realize functions of:
specifying a quality required for a print medium included in a product for which an instruction for production on a specific production line among a plurality of production lines is given; and
performing a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
wherein the time information is information on an execution deadline of a predetermined process,
wherein the predetermined process is a process of shipping the product.

10. A non-transitory computer readable medium storing a program causing a computer to realize functions of:
specifying a quality required for a print medium included in a product for which an instruction for production on a specific production line among a plurality of production lines is given; and
performing a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
wherein the time information is information on an executable time of a predetermined process,
wherein the predetermined process is a process of shipping the product.

11. An information processing method comprising:
specifying a quality required for a print medium included in a product for which an instruction for production on a specific production line among a plurality of production lines is given; and
performing a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
wherein the time information is information on an execution deadline of a predetermined process,
wherein the predetermined process is a process of shipping the product.

12. An information processing method comprising:
- specifying a quality required for a print medium included in a product for which an instruction for production on a specific production line among a plurality of production lines is given; and
  - performing a control such that one inspection apparatus having an inspection accuracy according to the quality performs an inspection of the print medium, the one inspection apparatus being included in a plurality of inspection apparatuses provided on the plurality of production lines, the one inspection apparatus performs inspections of a plurality of print mediums in an order according to time information on the plurality of production lines, in a case where the one inspection apparatus is controlled to perform inspections of the plurality of print mediums printed on the plurality of production lines,
- wherein the time information is information on an executable time of a predetermined process,
- wherein the predetermined process is a process of shipping the product.

\* \* \* \* \*